United States Patent Office 2,706,168
Patented Apr. 12, 1955

2,706,168

TREATMENT OF MAGNESIA-CALCIUM OXIDE SILICA COMPOSITES AND CRACKING PROCESS

William A. Pardee, Fox Chapel, and George E. Elliott, Jr., Oakmont, Pa., assignors to Gulf Research & Development Company, Pittsburgh, Pa., a corporation of Delaware No Drawing. Application July 20, 1950,
Serial No. 175,002

5 Claims. (Cl. 196—52)

This invention relates to a process of treating composites composed of magnesia, calcium oxide and silica. More particularly, the invention relates to a process of treating magnesia-calcium oxide-silica composites prepared by a method comprising partially replacing the calcium in a calcium silicate with magnesium, to accomplish desirable changes in the density, surface area or catalytic activity of the composites. The invention also relates to a catalytic cracking process in which a high molecular weight hydrocarbon, such as a petroleum oil, is contacted with such a treated composite under catalytic cracking conditions to form lower molecular weight hydrocarbons.

Composites of magnesia, calcium oxide and silica have been employed as adsorbents, particularly as decolorizing agents for oils such as lubricating oils. They have also been proposed for use as catalysts in the catalytic cracking of high molecular weight hydrocarbons such as heavy petroleum oils, which includes such oils as gas oils, reduced crudes, and the like. Composites of this class can be manufactured by a variety of methods among which may be mentioned, base exchanging with a soluble calcium salt such as calcium chloride any suitable magnesium silicate such as one prepared by reacting a sodium silicate with a soluble magnesium salt, to replace a selected proportion, preferably a small proportion, of the magnesium by calcium; forming a composite gel or gelatinous precipitate composed of magnesia, calcium oxide, and silica by co-precipitating these compounds, for example, by acidifying an alkaline solution of suitable salts; or by sequentially precipitating the hydroxides, for example by first preparing a silica hydrogel and then combining the hydrogel with previously prepared hydroxides of magnesium and calcium; and grinding, for example in a ball mill, the dry active oxides until a substantially uniform composite is obtained. The more important magnesia-calcium oxide-silica composites, however, are manufactured by methods involving base exchanging a naturally occurring or synthetically prepared calcium silicate with a soluble magnesium salt to replace the majority of the calcium with magnesium. In the manufacture of composites by this method, the calcium silicate may be prepared, for example, by autoclaving sand or diatomaceous earth with an aqueous suspension of calcium hydroxide and caustic soda; by thermally liquefying a mixture of silica and a suitable calcium compound such as calcium oxide, and then quenching and pulverizing; or by conventional chemical methods resulting in substantially pure calcium silicate.

The base exchange procedure employed will differ in minor respects depending upon the specific character of the calcium silicate employed; however, in general this procedure comprises contacting the calcium silicate material, preferably in finely divided form, with an aqueous solution of a magnesium salt, preferably magnesium chloride, at elevated temperature conditions below the boiling point of the solution, for example, temperatures within the range of about 100° to 220° F., the contact between the solution and the calcium silicate being maintained until the desired extent of base exchange has been accomplished. The time required to effect a selected replacement of the calcium by magnesium varies depending upon the temperature and the concentration of the magnesium salt solution.

The magnesium-calcium oxide-silica composites can be employed as catalysts in any of the conventional catalytic cracking processes. When they are employed as catalysts in the fixed or moving bed types of processes, the composites are preferably employed in the form of small granules, pellets, or beads. When employed in the fluid type cracking process, the composites are used in finely divided form. In any of these cracking processes the cracking operation may be carried out at temperatures within the range of about 700° to about 1100° F. and at atmospheric or slightly higher pressure. The composites, however, have been found to be especially effective when the operation is carried out at temperatures within the range of about 850° to 950° F. In many types of catalytic cracking operations it is advantageous to supply the endothermic heat of cracking by means of the catalyst. When operating in this way it is desirable to employ a catalyst having a relatively high heat capacity since otherwise the heat can only be supplied by employing a larger amount of catalyst. Since the heat capacity of a cracking catalyst is a function of the density of the catalyst, it is desirable to employ a catalyst having as high a density as is consistent with satisfactory activity.

The present invention is concerned with a process of treating magnesia-calcium oxide-silica composites whereby the density, surface characteristics or catalytic cracking activity can be altered. We have discovered that changes in these and other characteristics of a magnesia-calcium oxide-silica composite can be accomplished by subjecting such a composite to the action of steam at a temperature within the range of about 250° to about 600° F. The treatment is preferably carried out under conditions such that the partial pressure of the steam is at least 30 pounds per square inch. In accordance with the preferred embodiments of the invention, the process is carried out by subjecting a magnesia-calcium oxide-silica composite to the action of saturated steam at a temperature within the above range, the pressure in these embodiments, of course, being the pressure of saturated steam at the temperature employed.

The treatment of the composites with steam in accordance with the invention can be carried out in various ways. The composite can be treated with a moving atmosphere containing steam exerting a partial pressure of at least 30 pounds per square inch. Satisfactory results are also obtained by placing the composite in a closed pressure-tight vessel containing water and then heating the vessel to the desired steaming temperature. Once this temperature has been reached, the desired effect on the composite will have been obtained. The composite is then removed from the vessel and calcined at a suitable temperature such as a temperature of 700° to 1200° F., specifically about 1000° F. Substantially the same results can be be obtained by disposing the composite in a closed vessel in which saturated steam can be maintained. The composite is placed in the vessel, the vessel is evacuated and then heated to the temperature of treatment. Thereafter saturated steam at this temperature is introduced into the vessel and is maintained therein for the desired period of treatment. When operating in this way, the time of treatment can vary from a few minutes to several hours, depending upon the temperature of the steam, the effect desired, and the calcium oxide content of the composite.

We have discovered that although certain desirable effects, such as increases in density, are accomplished on magnesia-calcium oxide-silica composites containing varying quantities of calcium oxide by subjecting them to treatment with steam at any temperature within the range specified, the optimum conditions of steam treatment for obtaining maximum catalytic cracking activity for a given composite vary in accordance with the calcium oxide content of the composite. Thus, we have found that the optimum temperature of steam treatment is in the lower portion of the range when the calcium oxide content of the composite is low and in the higher portion of the range when the calcium oxide content is high. For calcium oxide contents of 18 per cent by weight and below, it appears that the temperature of steam treatment to produce maximum catalytic cracking activity will vary almost directly in accordance with the calcium oxide content. Inasmuch as the value of magnesia-calcium oxide-silica composites is dependent largely upon the physical sturdiness of these materials and composites containing more than about 18 per cent by weight of calcium oxide are physically weak, the present process is especially important for the treatment of composites containing between about 1 and about 18 per cent by weight calcium oxide.

In order that the invention may be understood more fully, reference should be had to the following specific examples. The magnesia-calcium oxide-silica composites of the examples were prepared by the generally conventional procedure of base exchanging a calcium silicate with a soluble magnesium salt until the desired amount of calcium has been replaced by magnesium, or stated in another way, until the calcium oxide content of the composite has reached the desired amount. More specifically, the composites were prepared by base exchanging a synthetically prepared calcium silicate with a solution of magnesium chloride hexahydrate. The calcium silicate was prepared by reacting a sodium silicate containing 28.7 per cent $SiO_2$ and 8.9 per cent $Na_2O$ with an aqueous solution of calcium chloride dihydrate in the presence of excess sodium hydroxide to obtain a precipitated calcium silicate containing 38.8 per cent of calcium oxide (as compared with 48.3 per cent calcium oxide in theoretical $CaO-SiO_2$) and then washing to remove sodium. The base exchange with the magnesium chloride hexahydrate was carried out by mixing a slurry of the calcium silicate with an aqueous solution of the magesium salt and then stirring the resulting mixture at a temperature of about 95° C. for about one hour. At the end of this time the mixture was filtered, washed with water until the wash water contained substantially no chloride ions, again filtered, and dried for about two days at 125° C. The dried mixture was calcined by being brought to 1000° F. in six hours and then maintained at that temperature for about ten hours. The calcined product was then broken into granules. In the base exchange procedure, the extent of the replacement of calcium by magnesium was controlled by adjusting the amount of magnesium chloride hexahydrate contained in the solution mixed with the calcium silicate slurry.

EXAMPLE I

In this example, the magnesia-calcium oxide-silica composite subjected to treatment analyzed 16.3 per cent MgO, 18.3 per cent CaO, and 64.5 per cent $SiO_2$ ignited basis). The analysis indicated that the remainder of the composite was made up of soda, chlorine, alumina, iron oxide and titania. Portions of this composite were subjected to treatment with saturated steam in a closed vessel containing excess water, the treatment being stopped when the desired temperature was reached, at temperatures of 350°, 450°, 500° and 600° F. The catalyst density, surface area and catalytic cracking activity of each of these portions, as well as of the untreated composite, were determined. The cracking activity of each portion was determined by passing a Mid-Continent straight run gas oil having an initial boiling point of 470° F. and an end point of 650° F. in contact with the composite in a fixed bed at a temperature of about 900° F. and at a space velocity (volumes of charge per volume of catalyst per hour) of 1.0 for one hour. The results obtained are given in the following Table 1.

*Table 1*

| Composite | IA | IB | IC | ID | IE |
|---|---|---|---|---|---|
| Steaming Temp. (° F.) | None | 350 | 450 | 500 | 600 |
| Composite Density (gms./cc.) | 0.236 | 0.288 | 0.290 | 0.285 | 0.279 |
| Surface Area: | | | | | |
| (m.²/gm.) | 389.2 | 287.9 | 350.6 | 338.4 | 314.5 |
| (m.²/cc.) | 92.0 | 83.0 | 101.9 | 96.5 | 87.9 |
| Catalytic Cracking, Yields (Wt. Percent Charge): | | | | | |
| Gasoline (400° F., E. P.) | 13.8 | 18.9 | 21.4 | 20.5 | 13.5 |
| Gascoke | 2.3 | 3.3 | 4.0 | 3.7 | 2.5 |
| Coke | 0.6 | 1.5 | 1.0 | 1.0 | 0.9 |

It will be seen from the results given in the table that under all conditions of steaming employed the density of the composite was increased, and that the catalytic cracking activity was increased by steaming at temperatures below 600° F. At the latter temperature, the activity of the composite had returned to about its original value. However, the composite steamed at 600° F. had increased value for use in certain types of processes, such as the fixed solid bed adiabatic process, because of its greater density. It will also be seen that the most active composite was that obtained by steaming at about 450° F.

EXAMPLE II

The magnesia-calcium oxide-silica composite subjected to treatment in this example analyzed 24.0 per cent MgO, 8.4 per cent CaO, and 66.5 per cent $SiO_2$. Five portions of this composite were steamed as described in Example I and, together with an untreated portion, were tested as described in that example. The results obtained are given in the following Table 2.

*Table 2*

| Composite | 2A | 2B | 2C | 2D | 2E | 2F |
|---|---|---|---|---|---|---|
| Steaming Temp. (° F.) | None | 350 | 400 | 450 | 500 | 600 |
| Composite Density (gms./cc.) | 0.362 | 0.406 | 0.428 | 0.420 | 0.383 | 0.384 |
| Surface Area: | | | | | | |
| (m.²/gm.) | 435.1 | 427.0 | 472.9 | 548.0 | 588.3 | 523.1 |
| (m.²/cc.) | 157.7 | 173.5 | 202.3 | 230.0 | 225.2 | 207.0 |
| Catalytic Cracking, Yields (Wt. Percent Charge): | | | | | | |
| Gasoline (400° F., E. P.) | 30.3 | 34.3 | 35.2 | 33.0 | 31.0 | 27.7 |
| Gascoke | 7.3 | 10.6 | 10.9 | 10.9 | 8.2 | 7.3 |
| Coke | 0.9 | 2.2 | 1.9 | 2.0 | 1.5 | 0.7 |

In this case it will be seen that the maximum cracking activity was obtained by steaming at 400° F. (composite 2C). However, improved activity was obtained at each steaming temperature up to 500° F. and increased density was obtained at every steaming temperature. Moreover, the surface area per unit volume was increased at every steaming temperature employed.

EXAMPLE III

The composite treated in this example analyzed 26.5 per cent MgO, 4.3 per cent CaO, and 66.6 per cent $SiO_2$. Portions of this composite were steamed and tested as described in the preceding examples. The results obtained are given in the following Table 3.

*Table 3*

| Composite | 3A | 3B | 3C | 3D | 3E | 3F | 3G |
|---|---|---|---|---|---|---|---|
| Steaming Temp. (° F.) | None | 250 | 300 | 350 | 450 | 500 | 600 |
| Composite Density (gms./cc.) | 0.435 | 0.469 | 0.477 | 0.465 | 0.457 | 0.439 | 0.417 |
| Surface Area: | | | | | | | |
| (m.²/gm.) | 493.7 | 407.8 | 430.8 | 476.3 | 573.5 | 590.5 | 530.5 |
| (m.²/cc.) | 214.2 | 191.0 | 205.2 | 221.7 | 262.3 | 259.3 | 221.5 |
| Catalytic Cracking, Yields (Wt. Percent Charge): | | | | | | | |
| Gasoline (400° F., E. P.) | 32.4 | 32.4 | 35.4 | 33.8 | 31.6 | 27.3 | 24.7 |
| Gascoke | 13.1 | 12.7 | 13.3 | 13.1 | 13.9 | 11.6 | 8.1 |
| Coke | 1.9 | 1.9 | 2.3 | 1.8 | 1.4 | 1.9 | 1.2 |

The data in Table 3 show that at every temperature of steaming below 500° F., the density of the composite was increased, and that at 450° F. to 600° F., the surface area was substantially increased by the steaming treatment. The optimum temperature of steaming for cracking activity was about 300° F.

EXAMPLE IV

Three other portions of the composite of Example III were subjected to the action of saturated steam at 450° F. under steady state conditions, i. e., conditions at which the composite was contacted with the steam without being steamed at lower temperatures. The first portion, 4B, was steamed under these conditions for 20 minutes, the second portion, 4C, for 40 minutes, and the third portion, 4D, for 60 minutes. The results obtained are given in the following table.

*Table 4*

| Composite | 4A | 4B | 4C | 4D |
|---|---|---|---|---|
| Steaming Temp. (° F.) | None | 450 | 450 | 450 |
| Time (Minutes) |  | 20 | 40 | 60 |
| Composite Density (gms./cc.) | 0.435 | 0.465 | 0.469 | 0.456 |
| Surface Area: |  |  |  |  |
| (m.²/gm.) | 493.7 | 480.4 | 470.0 | 491.0 |
| (m.²/cc.) | 214.2 | 223.8 | 220.5 | 224.0 |
| Catalytic Cracking, Yields (Wt. Percent Charge): |  |  |  |  |
| Gasoline (400° F., E. P.) | 32.4 | 33.0 | 33.1 | 31.7 |
| Gascoke | 13.1 | 12.7 | 13.4 | 12.6 |
| Coke | 1.9 | 1.8 | 1.8 | 1.9 |

It will be understood that results similar to those given in the foregoing examples can be obtained by subjecting other members of the class of magnesia-calcium oxide-silica composites previously described to the action of steam at temperatures between about 250° and about 650° F. For example, in treatments carried out at temperatures above the optimum temperature for maximum increase in catalytic cracking activity on a composite analyzing 30.0 per cent MgO, 1.3 per cent CaO, and 67.6 per cent $SiO_2$, substantial increases in density and surface area were obtained. Our work has shown that the temperature at which maximum increase in cracking activity is reached with this composite is within the range of about 250° to about 300° F.

Although the composites with which the present invention is concerned can contain varying quantities of magnesia, calcium oxide and silica, the process is especially valuable when applied to the treatment of composites containing at least 50 per cent by weight silica with the remainder being largely magnesia and calcium oxide, only a few per cent at most of the composites being made up of other metal oxides. The magnesia content of the composites preferably ranges from about 10 to about 40 per cent.

The present process is effective when applied to the treatment of calcined magnesia-calcium oxide-silica composites. This is advantageous in that the calcined composites are stable, finished materials. By subjecting them to treatment as described, their properties can be altered in desired directions. In general, the calcination of the composites should be carried out at temperatures of about 700° to about 1200° F.

The composites subjected to treatment in accordance with the invention may consist substantially solely of magnesia, calcium oxide and silica or they may contain in addition a proportion of one or more other metal oxides, such as alumina and zirconia. We have found, for example, that the properties of a magnesia-calcium oxide-silica composite such as described above and containing also about 3 to 10 per cent alumina by weight are improved by a steaming treatment in accordance with the invention. Thus, the activity as a cracking catalyst of such a composite is substantially improved by the steam treatment.

Obviously many modifications and variations of the invention, as hereinbefore set forth, may be made without departing from the spirit or scope thereof and therefore only such limitations should be imposed as are indicated in the appended claims.

We claim:

1. A process comprising subjecting a magnesia-calcium oxide-silica composite containng about 1–18 per cent calcium oxide to the action of saturated steam at a temperature within the range of about 250° to about 600° F., and then calcining the steamed composite.

2. A process comprising subjecting a calcined magnesia-calcium oxide-silica composite containing about 1–18 per cent calcium oxide to the action of saturated steam at a temperature within the range of about 250° F. to about 600° F., and then calcining the steamed composite.

3. A process comprising subjecting a calcined magnesia-calcium oxide-silica composite containing about 1 to 18 per cent calcium oxide by weight to the action of saturated steam at a temperature within the range of about 250° to about 600° F., said temperature being within the low part of said range for a low calcium oxide content composite and within the high part of said range for a high, calcium oxide content composite and then calcining the steamed composite.

4. A process in accordance with claim 3 in which said magnesia-calcium oxide-silica composite is prepared by a process comprising base exchanging a calcium silicate with a water-soluble magnesium salt to replace calcium in said calcium silicate with magnesium.

5. A process comprising contacting a high molecular weight hydrocarbon under catalytic cracking conditions including a temperature of about 700° to about 1100° F. with a magnesia-calcium oxide-silica composite treated as described in claim 3 to convert said high molecular weight hydrocarbon to lower molecular weight hydrocarbons.

References Cited in the file of this patent

UNITED STATES PATENTS

| | | |
|---|---|---|
| 2,350,282 | LaLande | May 30, 1944 |
| 2,406,112 | Schulze | Aug. 20, 1946 |
| 2,430,249 | Ruthruff | Nov. 4, 1947 |
| 2,470,193 | Stratford | May 17, 1949 |
| 2,485,260 | Connolly | Oct. 18, 1949 |
| 2,495,723 | Harmann | Jan. 31, 1950 |
| 2,605,237 | Webb | July 29, 1952 |